United States Patent
Chitti et al.

(10) Patent No.: US 10,057,327 B2
(45) Date of Patent: Aug. 21, 2018

(54) CONTROLLED TRANSFER OF DATA OVER AN ELASTIC NETWORK

(71) Applicant: INTERNATIONAL BUSINESS MACHINES CORPORATION, Armonk, NY (US)

(72) Inventors: Mark V. Chitti, Lexington, KY (US); Douglas M. Freimuth, New York, NY (US); John F. Hollingsworth, Wynnewood, PA (US); Baiju D. Mandalia, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 84 days.

(21) Appl. No.: 14/952,449

(22) Filed: Nov. 25, 2015

(65) Prior Publication Data
US 2017/0149863 A1    May 25, 2017

(51) Int. Cl.
*H04L 29/08* (2006.01)
*H04L 12/863* (2013.01)
*H04L 12/24* (2006.01)

(52) U.S. Cl.
CPC .......... *H04L 67/06* (2013.01); *H04L 41/0896* (2013.01); *H04L 47/622* (2013.01); *H04L 67/10* (2013.01)

(58) Field of Classification Search
None
See application file for complete search history.

(56) References Cited

U.S. PATENT DOCUMENTS

| | | |
|---|---|---|
| 4,144,414 A | 3/1979 | Nicholas |
| 6,205,477 B1 | 3/2001 | Johnson et al. |
| 6,389,432 B1 | 5/2002 | Srinivas et al. |
| 6,418,139 B1 | 7/2002 | Akhtar |

(Continued)

FOREIGN PATENT DOCUMENTS

WO    2014021839 A1    2/2014

OTHER PUBLICATIONS

Office Action in U.S. Appl. No. 14/952,466, dated Jun. 26, 2017, pp. 1-35.

(Continued)

*Primary Examiner* — Thomas J Dailey
(74) *Attorney, Agent, or Firm* — William Hartwell; Matthew M. Hulihan; Heslin Rothenberg Farley & Mesiti, PC (57) ABSTRACT

Controlled transfer of data over an elastic network is provided and includes analyzing properties of a set of data for transfer from a source storage location to a target storage location across an elastic cloud computing network as part of a staged transfer of the set of data, assigning transfer queue weightings to data subsets of the set of data based on weighting parameters, the transfer queue weightings dictating order of transfer of the data subsets from the source storage location to the target storage location, and controlling transfer of the data subsets from the source storage location to the target storage location consistent with the transfer queue weightings assigned to the data subsets, the controlling transfer including controlling, based on costs to transfer the data subsets, bandwidth allocation of the elastic cloud computing network and a transfer schedule for the data subsets.

20 Claims, 6 Drawing Sheets

(56) References Cited

U.S. PATENT DOCUMENTS

| | | |
|---|---|---|
| 6,563,829 B1 | 5/2003 | Lyles et al. |
| 6,937,566 B1 | 8/2005 | Forslow |
| 7,089,294 B1 | 8/2006 | Baskey et al. |
| 7,103,906 B1 | 9/2006 | Katz |
| 7,542,420 B1 | 6/2009 | Mokhtar et al. |
| 7,590,746 B2 | 9/2009 | Slater |
| 7,685,310 B2 | 3/2010 | Ueoka et al. |
| 7,808,918 B2 | 10/2010 | Bugenhagen |
| 7,844,967 B2 | 11/2010 | Kelly |
| 7,983,299 B1* | 7/2011 | Ma .................. H04L 47/52 370/229 |
| 8,412,824 B1 | 4/2013 | Schiff |
| 8,464,335 B1 | 6/2013 | Sinha et al. |
| 8,660,008 B2 | 2/2014 | Babiarz et al. |
| 8,762,505 B2 | 6/2014 | Kutan et al. |
| 8,788,690 B2 | 7/2014 | Short et al. |
| 8,793,343 B1 | 7/2014 | Sorenson, III et al. |
| 8,799,320 B2 | 8/2014 | Chan et al. |
| 8,873,753 B2 | 10/2014 | Parker |
| 8,937,865 B1* | 1/2015 | Kumar .................. H04L 47/125 370/235 |
| 9,026,671 B2 | 5/2015 | Gillies et al. |
| 9,172,771 B1 | 10/2015 | Gross et al. |
| 9,207,993 B2 | 12/2015 | Jain |
| 9,330,156 B2 | 5/2016 | Satapathy |
| 9,495,251 B2 | 11/2016 | Kottomtharayil |
| 9,535,776 B2 | 1/2017 | Klose |
| 9,596,144 B2 | 3/2017 | Anderson |
| 2002/0049841 A1 | 4/2002 | Johnson |
| 2002/0101869 A1 | 8/2002 | Garcia-Luna-Aceves et al. |
| 2002/0112113 A1 | 8/2002 | Karpoff et al. |
| 2002/0124262 A1 | 9/2002 | Basso et al. |
| 2002/0133613 A1 | 9/2002 | Teng et al. |
| 2002/0144174 A1 | 10/2002 | Nwabueze |
| 2002/0181394 A1 | 12/2002 | Partain et al. |
| 2002/0194324 A1 | 12/2002 | Guha |
| 2003/0021338 A1 | 1/2003 | Mazzoni |
| 2003/0037061 A1 | 2/2003 | Sastri et al. |
| 2003/0069963 A1 | 4/2003 | Jayant et al. |
| 2003/0110263 A1 | 6/2003 | Shillo |
| 2003/0120666 A1 | 6/2003 | Tacaille et al. |
| 2003/0126132 A1 | 7/2003 | Kavuri et al. |
| 2003/0172130 A1 | 9/2003 | Fruchtman et al. |
| 2003/0202477 A1 | 10/2003 | Zhen et al. |
| 2004/0098671 A1 | 5/2004 | Graham et al. |
| 2004/0198360 A1 | 10/2004 | Kotzin |
| 2004/0199566 A1 | 10/2004 | Carlson et al. |
| 2004/0215644 A1 | 10/2004 | Edwards, Jr. et al. |
| 2004/0215749 A1 | 10/2004 | Tsao |
| 2004/0246972 A1 | 12/2004 | Wang et al. |
| 2005/0027345 A1 | 2/2005 | Horan et al. |
| 2005/0033935 A1 | 2/2005 | Manbert et al. |
| 2005/0125593 A1 | 6/2005 | Karpoff et al. |
| 2005/0129000 A1 | 6/2005 | Sivakumar et al. |
| 2005/0154841 A1 | 7/2005 | Sastri et al. |
| 2005/0289618 A1 | 12/2005 | Hardin |
| 2006/0039381 A1 | 2/2006 | Anschutz et al. |
| 2006/0120282 A1* | 6/2006 | Carlson .............. H04L 12/2801 370/229 |
| 2006/0129562 A1 | 6/2006 | Pulamarasetti et al. |
| 2006/0171390 A1 | 8/2006 | LaJoie |
| 2006/0206682 A1 | 9/2006 | Manbert et al. |
| 2006/0218369 A1 | 9/2006 | Fujino |
| 2006/0248231 A1 | 11/2006 | O'Rourke et al. |
| 2006/0265558 A1 | 11/2006 | Fujino |
| 2007/0022264 A1 | 1/2007 | Bromling et al. |
| 2007/0065078 A1 | 3/2007 | Jiang |
| 2007/0106798 A1 | 5/2007 | Masumitsu |
| 2007/0195765 A1 | 8/2007 | Heissenbuttel et al. |
| 2007/0198627 A1 | 8/2007 | Bozionek et al. |
| 2008/0109450 A1 | 5/2008 | Clark et al. |
| 2008/0115144 A1 | 5/2008 | Tsao |
| 2008/0126525 A1 | 5/2008 | Ueoka et al. |
| 2008/0140850 A1 | 6/2008 | Gade et al. |
| 2008/0259798 A1 | 10/2008 | Loh |
| 2008/0320097 A1 | 12/2008 | Sawicki et al. |
| 2009/0007199 A1 | 1/2009 | JaJoie |
| 2009/0061853 A1 | 3/2009 | Anschutz |
| 2009/0100163 A1 | 4/2009 | Tsao |
| 2009/0172782 A1 | 7/2009 | Taglienti et al. |
| 2009/0187668 A1 | 7/2009 | Arendt et al. |
| 2009/0204711 A1 | 8/2009 | Binyamin |
| 2009/0217326 A1 | 8/2009 | Hasek |
| 2009/0240867 A1 | 9/2009 | Shibayama et al. |
| 2009/0271589 A1 | 10/2009 | Karpoff et al. |
| 2010/0257602 A1 | 10/2010 | Kettler et al. |
| 2010/0268632 A1 | 10/2010 | Rosenthal |
| 2010/0274656 A1 | 10/2010 | Genschel |
| 2010/0306382 A1 | 12/2010 | Cardosa |
| 2010/0306445 A1 | 12/2010 | Dake |
| 2010/0332401 A1 | 12/2010 | Prahlad et al. |
| 2011/0004550 A1 | 1/2011 | Giordano et al. |
| 2011/0022697 A1 | 1/2011 | Huh |
| 2011/0078227 A1 | 3/2011 | McAloon et al. |
| 2011/0083037 A1 | 4/2011 | Bocharov et al. |
| 2011/0125889 A1 | 5/2011 | Tsao |
| 2011/0158653 A1 | 6/2011 | Mazed |
| 2011/0208710 A1 | 8/2011 | Lesavich |
| 2011/0218770 A1 | 9/2011 | Ii |
| 2011/0282928 A1 | 11/2011 | Ball et al. |
| 2011/0293278 A1 | 12/2011 | Mazed |
| 2012/0023545 A1 | 1/2012 | Qu |
| 2012/0063353 A1 | 3/2012 | Schlenk |
| 2012/0072600 A1 | 3/2012 | Richardson et al. |
| 2012/0109705 A1 | 5/2012 | Belady et al. |
| 2012/0131309 A1 | 5/2012 | Johnson |
| 2012/0137173 A1 | 5/2012 | Burshan et al. |
| 2012/0180080 A1 | 7/2012 | LaJoie |
| 2012/0201130 A1 | 8/2012 | Liv et al. |
| 2012/0210381 A1 | 8/2012 | Ozawa |
| 2012/0216259 A1 | 8/2012 | Okamoto et al. |
| 2012/0331221 A1 | 12/2012 | Cho |
| 2013/0003538 A1* | 1/2013 | Greenberg .............. H04L 47/12 370/230 |
| 2013/0007254 A1 | 1/2013 | Fries |
| 2013/0031258 A1 | 1/2013 | Mukai et al. |
| 2013/0081014 A1 | 3/2013 | Kadatch |
| 2013/0185404 A1 | 7/2013 | Patel et al. |
| 2013/0204963 A1 | 8/2013 | Boss et al. |
| 2013/0205002 A1* | 8/2013 | Wang .................. H04L 69/16 709/224 |
| 2013/0212282 A1 | 8/2013 | Pulier |
| 2013/0212422 A1 | 8/2013 | Bauer et al. |
| 2013/0227009 A1 | 8/2013 | Padmanaban et al. |
| 2013/0242903 A1 | 9/2013 | Narkar |
| 2013/0254383 A1 | 9/2013 | Wray |
| 2013/0254407 A1 | 9/2013 | Pijewski |
| 2013/0268672 A1 | 10/2013 | Justafort |
| 2013/0282795 A1 | 10/2013 | Tsao |
| 2014/0040343 A1 | 2/2014 | Nickolov et al. |
| 2014/0057592 A1 | 2/2014 | Chetlur |
| 2014/0068076 A1* | 3/2014 | Dasher ................. H04L 65/4076 709/226 |
| 2014/0075029 A1 | 3/2014 | Lipchuk |
| 2014/0082301 A1 | 3/2014 | Barton et al. |
| 2014/0082681 A1 | 3/2014 | Brown et al. |
| 2014/0089510 A1 | 3/2014 | Hao et al. |
| 2014/0098685 A1 | 4/2014 | Shattil |
| 2014/0115189 A1 | 4/2014 | Ao et al. |
| 2014/0129819 A1 | 5/2014 | Huang et al. |
| 2014/0180664 A1 | 6/2014 | Kochunni et al. |
| 2014/0188801 A1 | 7/2014 | Ramakrishnan et al. |
| 2014/0207968 A1 | 7/2014 | Kumar et al. |
| 2014/0233587 A1 | 8/2014 | Liu et al. |
| 2014/0244835 A1 | 8/2014 | Lopez Alvarez |
| 2014/0258535 A1* | 9/2014 | Zhang .................. H04L 41/0806 709/226 |
| 2014/0281015 A1* | 9/2014 | Orona .................. H04L 67/06 709/232 |
| 2014/0289205 A1 | 9/2014 | Soichi |
| 2014/0344879 A1* | 11/2014 | Phillips ............ H04N 21/23805 725/115 |
| 2014/0365658 A1 | 12/2014 | Lang et al. |
| 2015/0006614 A1 | 1/2015 | Suryanarayanan |

(56) References Cited

U.S. PATENT DOCUMENTS

| | | | |
|---|---|---|---|
| 2015/0019740 A1 | 1/2015 | Zhao | |
| 2015/0026793 A1 | 1/2015 | Li | |
| 2015/0046960 A1 | 2/2015 | Hardin | |
| 2015/0067093 A1 | 3/2015 | Sawicki et al. | |
| 2015/0067744 A1 | 3/2015 | Furtwangler | |
| 2015/0082362 A1 | 3/2015 | Hasek | |
| 2015/0117198 A1 | 4/2015 | Menezes et al. | |
| 2015/0134731 A1 | 5/2015 | Wang et al. | |
| 2015/0134830 A1 | 5/2015 | Popa | |
| 2015/0156204 A1 | 6/2015 | Resch | |
| 2015/0172070 A1 | 6/2015 | Csaszar | |
| 2015/0195173 A1 | 7/2015 | Gupta et al. | |
| 2015/0222445 A1 | 8/2015 | Iyer et al. | |
| 2015/0234636 A1 | 8/2015 | Barnes, Jr. | |
| 2015/0235308 A1 | 8/2015 | Mick et al. | |
| 2015/0288919 A1 | 10/2015 | Labosco | |
| 2015/0339169 A1* | 11/2015 | Siddiqui | G06F 9/46 718/104 |
| 2016/0066261 A1 | 3/2016 | Nasielski et al. | |
| 2016/0197835 A1 | 7/2016 | Luft | |
| 2016/0197848 A1 | 7/2016 | Bhide | |
| 2016/0231948 A1 | 8/2016 | Gupta et al. | |
| 2017/0076057 A1 | 3/2017 | Burton | |
| 2017/0090773 A1 | 3/2017 | Vijayan | |
| 2018/0062943 A1 | 3/2018 | Djukic et al. | |

OTHER PUBLICATIONS

Office Action in U.S. Appl. No. 14/952,456, dated May 17, 2017, pp. 1-25.

Office Action in U.S. Appl. No. 14/952,463, dated May 22, 2017, pp. 1-27.

Hwang et al., "Design and Implementation of an iLVM Mechanism for Remote Mirror", Kuasir College of Electrical Engineering and Computer Science, Department of Electrical Engineering, Journal of Internet Technology, 7(2), Apr. 2006, pp. 169-176.

XRoads Networks, "Dynamic Bandwidth Management", retrieved from internet Nov. 11, 2014, http://dualwanfirewalls.com/ubm/solutions/dynamic_bandwidth_control.xm, pp. 1-4.

IBM, Internal Model for Dynamically-Virtualizing the Storage of Data Between a RAID-6 and a Mirror, IP.com, No. 000160533, Nov. 19, 2007, pp. 1-5.

Weil, Reliable, Scalable, and High-Performance Distributed Storage: Distributed Object Storage, IP.com, No. 000234957, Feb. 19, 2014, pp. 1-11.

List of IBM Patents or Patent Applications Treated as Related, Dec. 1, 2015, pp. 1-2.

Office Action in U.S. Appl. No. 14/731,834, dated Apr. 19, 2017, pp. 1-22.

Office Action in U.S. Appl. No. 14/952,437, dated Sep. 18, 2017, pp. 1-36.

Notice of Allowance in U.S. Appl. No. 14/952,456, dated Sep. 15, 2017, pp. 1-14.

Office Action in U.S. Appl. No. 14/952,469, dated Oct. 3, 2017, pp. 1-51.

Elali, H., SAN Zone Reuse in Port Allocation, https://coprhd.atlassian.net/wiki/spaces/COP/pages/8618000/SAN+Zone+Reuse+in+Port+Allocation, Oct. 15, 2015 (6 pages).

List of IBM Patents or Patent Applications Treated as Related, Dec. 18, 2017, pp. 1-2.

* cited by examiner

CONTROLLED TRANSFER OF DATA OVER AN ELASTIC NETWORK

BACKGROUND

Aspects described herein relate to configuration of network features, including features of a network offering elastic bandwidth allocation capabilities. Bandwidth is conventionally provisioned to meet a projected peak data demand and paid for over the course of a contract that may stretch for several years. Peak demand may occur relatively infrequently, resulting in over-provisioning for a significant amount of time. This over-provisioning of the bandwidth results in excess costs to a customer who is paying for unused bandwidth over the course of the contract.

An attempt to lower costs by provisioning less bandwidth over the course of the contract is largely ineffective because of expensive overcharges when peak demand exceeds the amount of bandwidth provisioned. Bandwidth considerations and costs are especially important in large data center applications, such as data mirroring or backup, where the amount of data being transferred, and therefore the resulting bandwidth consumption, is potentially massive.

SUMMARY

Shortcomings of the prior art are overcome and additional advantages are provided through the provision of a computer-implemented method that includes: analyzing properties of a set of data for transfer from a source storage location to a target storage location across an elastic cloud computing network as part of a staged transfer of the set of data, the elastic cloud computing network having controllable elastic network bandwidth for the source storage location and the target storage location; assigning transfer queue weightings to data subsets of the set of data based on weighting parameters, the transfer queue weightings dictating order of transfer of the data subsets from the source storage location to the target storage location; and controlling transfer of the data subsets from the source storage location to the target storage location consistent with the transfer queue weightings assigned to the data subsets, the controlling transfer comprising controlling, based on costs to transfer the data subsets, bandwidth allocation of the elastic cloud computing network and a transfer schedule for the data subsets.

Further, a computer program product including a computer readable storage medium readable by a processor and storing instructions for execution by the processor is provided for performing a method that includes: analyzing properties of a set of data for transfer from a source storage location to a target storage location across an elastic cloud computing network as part of a staged transfer of the set of data, the elastic cloud computing network having controllable elastic network bandwidth for the source storage location and the target storage location; assigning transfer queue weightings to data subsets of the set of data based on weighting parameters, the transfer queue weightings dictating order of transfer of the data subsets from the source storage location to the target storage location; and controlling transfer of the data subsets from the source storage location to the target storage location consistent with the transfer queue weightings assigned to the data subsets, the controlling transfer comprising controlling, based on costs to transfer the data subsets, bandwidth allocation of the elastic cloud computing network and a transfer schedule for the data subsets.

Yet further, a computer system is provided that includes a memory and a processor in communications with the memory, wherein the computer system is configured to perform a method including: analyzing properties of a set of data for transfer from a source storage location to a target storage location across an elastic cloud computing network as part of a staged transfer of the set of data, the elastic cloud computing network having controllable elastic network bandwidth for the source storage location and the target storage location; assigning transfer queue weightings to data subsets of the set of data based on weighting parameters, the transfer queue weightings dictating order of transfer of the data subsets from the source storage location to the target storage location; and controlling transfer of the data subsets from the source storage location to the target storage location consistent with the transfer queue weightings assigned to the data subsets, the controlling transfer comprising controlling, based on costs to transfer the data subsets, bandwidth allocation of the elastic cloud computing network and a transfer schedule for the data subsets.

Aspects of the above have advantages in that by weighting the transfer of data and controlling that transfer by tailoring bandwidth and the schedule of transfer, onboarding or data transfer is facilitated at a reduced and/or optimized cost.

A weighting parameter of the weighting parameters can include a rate of change of the set of data or a data subset thereof, which has an advantage of prioritizing transfer of data that is changing relatively fast in order to bolster data currency of the transferred data.

The target storage location can include an intermediate storage location for the staged transfer, which staged transfer can include a transfer from the intermediate storage location to a destination storage location. Movement of the data to a storage closer to the destination data center at an earlier time, though not required, has an advantage of reducing the latency experienced in putting the data in production-ready format at the destination.

The transfer of the data subsets to the target storage location may be performed as part of a cloud onboarding procedure, wherein the data subsets are transferred and stored to the intermediate storage location in a different structure than expected for the destination storage location. Transfer of the data subsets from the intermediate storage location to the destination storage location may be initiated for storage at the destination storage location in a structure for runtime usage of one or more applications. An advantage provided by these aspects is that the unstructured information can be sent on a schedule such that it is available at the intermediate location (which may be storage at the destination location) for quickly placing the data into production-ready format at the destination when called-on. This can help to avoid delays experienced due to network issues in cases of a direct transfer from source to destination (in the desired format) without an intermediate staging area. Using an intermediate storage location adds flexibility to transfer the data under parameters (timing, etc.) that optimize costs because, as one example, the data is placed into the intermedia storage in a format that need not comply with the final format needed for production.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects described herein leverage elastic network technologies that provide for dynamic provisioning of wide area network bandwidth and transfer capability between sites. More particularly, aspects described herein provide for a controlled transfer of data scheduled based on optimizing dynamic elastic network bandwidth allocation to effect the transfer. An example application of this technology is an onboarding procedure to onboard a customer to a cloud site.

Figure 1:
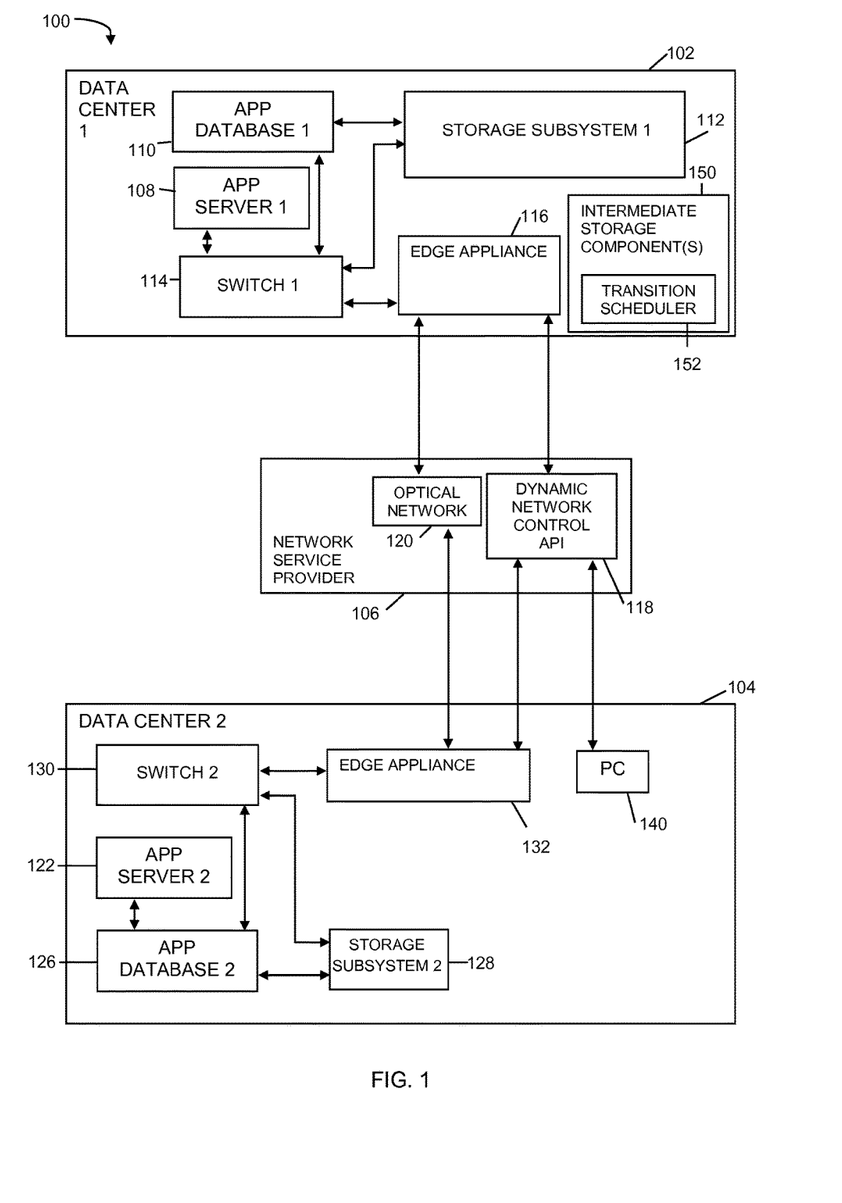
FIG. 1 depicts an example computing environment having elastic network capabilities, to incorporate and use aspects described herein.

FIG. 1 depicts an example computing environment having elastic network capabilities, to incorporate and use aspects described herein. In some examples, dedicated channel(s) across a network are utilized for data transfer from a first storage resource/location to a second storage resource/location. Environment 100 provides, as an example, data transfer between a first site 102 and a second site 104 using at least one network service provider 106 providing an elastic cloud computing network. In one embodiment, network service provider 106 provides a programmable WAN that is used for the data transfer.

First site 102 includes a first application server 108 (i.e. a computer) hosting one or more applications, a first application database 110, a first storage subsystem 112 (i.e., a first storage resource), for instance a storage area network (SAN) volume controller (SVC), a first switch 114 (such as a SAN switch) and a first edge appliance 116, which may be a router or other edge device, for example. In one embodiment, application server 108 or storage subsystem 112 runs a data replication application that replicates data in first application database 110 from first storage subsystem 112 via first switch 114 and first edge appliance 116.

Management of elastic network bandwidth allocation is provided in the environment. A feature of the environment 100 is that one or more processes can determine and inform a dynamic network control application programming interface (API) 118 of the network service provider about when and how much bandwidth of an elastic cloud computing network 120 should be allocated for transfer of data, which transfer may utilize a dedicated channel to the second site 104 via a network 120. In this example, network 120 is an optical network provided by network service provider 106. In one embodiment, optical network 120 is used as a WAN. In another embodiment, optical network 120 is a Multiprotocol Label Switching (MPLS) network and application server 108 utilizes a Fiber Channel over Ethernet EDU01 network interface to connect first switch 114 and first edge appliance 116 to the MPLS network.

Dynamic network control API 118 is executed, in one example, by a transport device (not shown), that is managed by network service provider 106. Dynamic network control API 118 allows first storage subsystem 112, second storage subsystem 128, an edge appliance (116, 132), a PC 140, or any other component at site 102, 104, or another site to dynamically change bandwidth allocation from network service provider 106. This is leveraged in accordance with aspects described herein to optimize bandwidth allocation and usage and therefore decrease the cost associated with transferring data using that bandwidth.

Second site 104 can include components similar to those of first site 102. Thus, in this example, second site similarly includes a second application server 122 (i.e., a computer), second application database 126, second storage subsystem 128 (i.e., a second storage resource), second switch 130, and a second edge appliance 132. In one embodiment, data is transferred from first site 102 to second site 104, i.e. from first storage subsystem 112 via first switch 114 and first edge appliance 116 over optical network 120 to second storage subsystem 128 via second edge appliance 132 and second switch 130. Data may be transferred similarly from second site 104 to first site 102.

An example data transfer from one site to another site occurs during a cloud onboarding procedure. Onboarding usually involves transfer of a significant amount of customer data in a short amount of time to transition the customer from one site to another site. Traditionally, backup media are made and shipped to the destination new location and the data is restored at the destination. This process is problematic for several reasons. One is data currency—data might change by the minute or second in many cases and physically shipping data on recordable media is not practical because the data becomes out-of-date so quickly. Coordination of the application and application content data, physical inventory, and usages of manual documentation processes are also problematic.

Even in situations where the customer data is digitally transferred over a network between the source and destination locations, the desire to onboard a large set of data in a short amount of time typically necessitates significant planning and downtime at a high cost.

Aspects described herein leverage elastic network capabilities to lower transfer costs for data transfer procedure(s), and this can factor into the overall planning for onboarding and other processes. A staged approach is disclosed for use with an elastic wide area network to transfer data to, e.g., a service provider hosted cloud. In some examples, the data is initially transferred to an intermediate storage.

Elastic bandwidth capability of the network 106 provides an alternative to other means of shipping, for instance physical shipment of media, or transfer over a static bandwidth connection. Dynamic bandwidth allocation capabilities enable exploitation of lower costs during idle or off-peak time, in this case to ship the set of data to (or closer to) the destination storage location where the customer is to be onboarded. Furthermore, as described in further detail herein, different portions, or data subsets, of the set of data may be weighted differently than others in terms of priority to transfer. This can factor into the timing and ordering in which subsets of the data are transferred. The weighting may be based on weighting parameters. Data subsets may be transferred in line with a production schedule that places data subsets at or near the destination location so that the data is readily and quickly placed at the final destination in the desired structure/format. By weighting the transfer of data and controlling that transfer by tailoring bandwidth and the schedule of transfer, this has an advantage of facilitating onboarding at a reduced and/or optimized cost.

Features of this staged transfer (and post-transfer to the destination, if an intermediate location is used) over an elastic wide area network provide a context-based transfer of data with parameters that include, as examples: size of data, time to transfer from the source storage location to the target storage location, prioritization, response time requirements, latency, and/or protocol used. These are items that have an effect on the resources used, demands placed on the system, timing and order of transfer, etc., and thus the process(es) may consider these in order to queue the transfer of the data. There is a predictive element in this, in that properties of dynamic bandwidth allocation (e.g. price at different future times and at different capacities) can factor into the determination of when to transfer subsets of the data in order to minimize transfer costs.

The subsets can, in some examples, be transferred and stored to an intermediate storage in a format or structure that is without regard to the structure needed for runtime usage (e.g. a format expected by the application). In a typical onboarding situation, the data after being transferred is prepared—arranged into a proper or expected structure, and this can take time. An advantage provided by aspects described herein is that the unstructured information can be sent on a schedule such that it is available at the intermediate location (which may be storage at the destination location) for quickly placing the data into production-ready format at the destination when called-on. This can help to avoid delays experienced due to network issues in cases of a direct transfer from source to destination (in the desired format) without an intermediate staging area. Movement of the data to a storage much closer to the destination data center, though not required, can reduce the latency experienced in putting the data in production-ready format at the destination.

Referring back to FIG. 1, an example is shown where data is to be transferred from a data center at second site 104 to a data center at first site 102. For instance, a transition or outsourcing provider is coordinating onboarding a customer at a new location (destination site 102) from an older location (source site 104). At the destination site 102, intermediate storage components 150 are provided to serve as an initial target storage location for the subsets of data being transferred. In the particular example of FIG. 1, data is first transferred to intermediate storage at the destination site. In other examples, the intermediate storage is located at a third site different from the first and second sites, for instance at a transition service provider site. Alternatively, no intermediate storage is utilized, in which case the data is transferred from the source storage location to the target storage location as the destination storage location.

A transition scheduler 152 is also provided at the destination site, in this example as one or more processes deployed to coordinate the onboarding as described herein. The transition scheduler 152 is show deployed as part of the destination site (for instance on a virtual machine thereof), but this is by way of example and not limitation; the scheduler could instead run at the source storage location (site 104) or any other site desired (such as a transition service provider site). A transition or onboarding service provider deploys and uses the transition scheduler 152 to analyze the data to be transferred, establish a transfer queue, and control the transfer of the subsets of data as described herein to facilitate a low price/low usage transfer that reduces or minimizes transfer costs by controlling, based on costs to transfer the subsets of data, bandwidth allocation of the elastic cloud computing networking and a transfer schedule for the subsets of data.

As described previously, the network service provider 106 can provide elastic and one-time capacity for sites to leverage in performing transfer of large amounts of data to a target storage location. Bandwidth cost information (price points given time, bandwidth capacity, and any other relevant parameters) is used in advanced planning as part of the scheduling of the staged transfer.

Properties of the data to be transferred can be analyzed for assigning transfer queue weightings. The properties can be populated automatically and/or manually (by a user) into a transfer data properties table shown below.

|  | Size (MB) | Priority | Data (GB) | Size | Priority |
|---|---|---|---|---|---|
| Application_1 | 1,082.67 | 3 | Data_1 | 3.087 | 2 |
| Application_2 | 614.01 | 1 | Data_2 | 49.3 | 1 |
| Application_3 | 387.6 | 2 | Data_3 | 4.221 | 3 |

The table enables the transition scheduler to determine properties for data to be transferred, including the size and priority of each application to be transferred, as well as the size and priority of the data elements to onboard. The priority might be dictated by customer policy and there may be dependencies between the different data elements. The customer might desire that its email application be up and running first, followed by the employee directory application, and then the enterprise resource planning application, as an example. In some examples, the size attributes are populated automatically and the priority is specified manually by a user.

Transfer queue weightings are assigned to subsets of this data based on weighting parameters. The particular subsets or portions into which the larger set of data is apportioned may or may not correspond to the delineations between the applications and application data. A subset or portion may refer to the entirety of an application and/or its application data. Alternatively, application data for one application might be divided into multiple subsets, for instance, and/or a single subset of data might include multiple applications and/or data from multiple applications. Thus, any granularity may be used in delineating the subsets of the set of data to be transferred.

The weighting parameters for assigning the transfer queue weightings can include any desired parameters, for instance data dependencies, size, or assigned priority. The parameters are used to dictate how to queue the data for transfer. Based on the bandwidth availability and cost, the data will be scheduled for transfer to the target storage location. In performing the transfer, the elastic nature of the bandwidth capability can be exploited to efficiently transfer the data, i.e. optimize bandwidth allocation and usage to minimize costs while adhering to the prioritization of the data transfer and overall schedule for the onboarding process.

Figure 2:
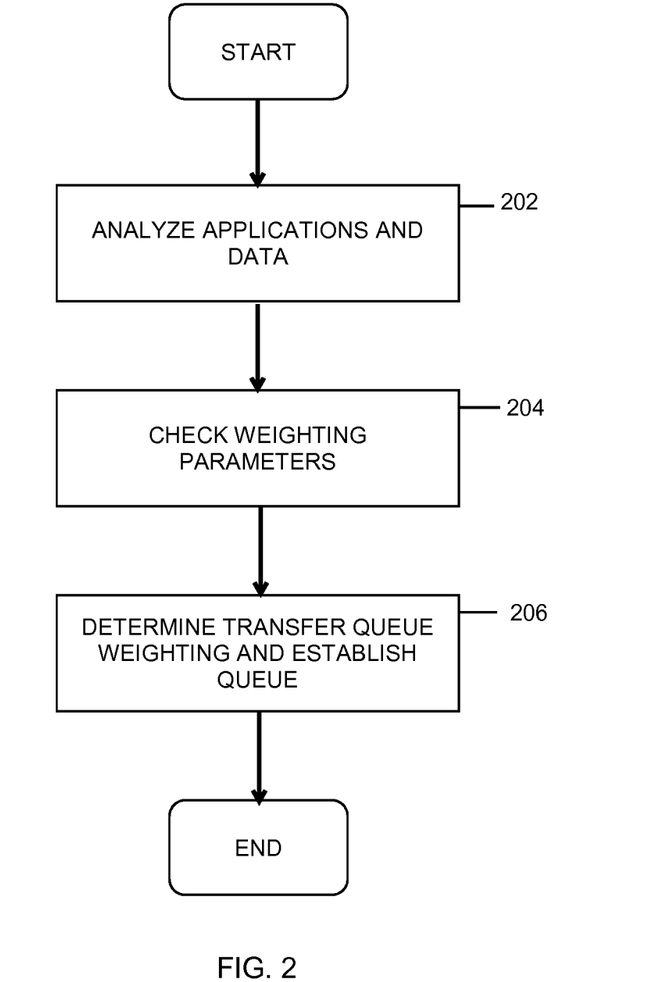
FIG. 2 depicts an example onboarding process in accordance with aspects described herein.

FIG. 2 depicts an example onboarding process in accordance with aspects described herein. In this example, the process is performed by a transition scheduler. The process begins by the transition scheduler analyzing properties of the applications and application data (202). Properties can include any characteristics that may impact a weighting parameter, such as size or rate of change of the data/data subset. The analysis is to harvest indicators that might influence how to weight the transfer priority of data subsets.

The transition scheduler then checks weight parameters (data dependencies, size, priority, rate of change) (204). Then the transition scheduler determines transfer queue weightings for the data subsets and establishes a resulting queue based on the transfer queue weightings (206). Weighting may be numerical and based on a scale, for instance between 0 and 1. If there is a dependency and/or user-specified priority, this might affect the weighting. Additionally or alternatively, priority can be set in part based on policies setup by a user. For example, application groups can be setup to prioritize the data transfer. As part of establishing the queue, the processing can take into account the elastic nature of the network including bandwidth availability and costs, as well as other factors such as the time to transfer, size of the subsets to transfer, response time requirements, latency, and/or protocol used to effect the transfer. The dynamic bandwidth allocation levels and the schedule to transfer the different subsets are controlled based on the costs involved in the transfer.

Figure 3:
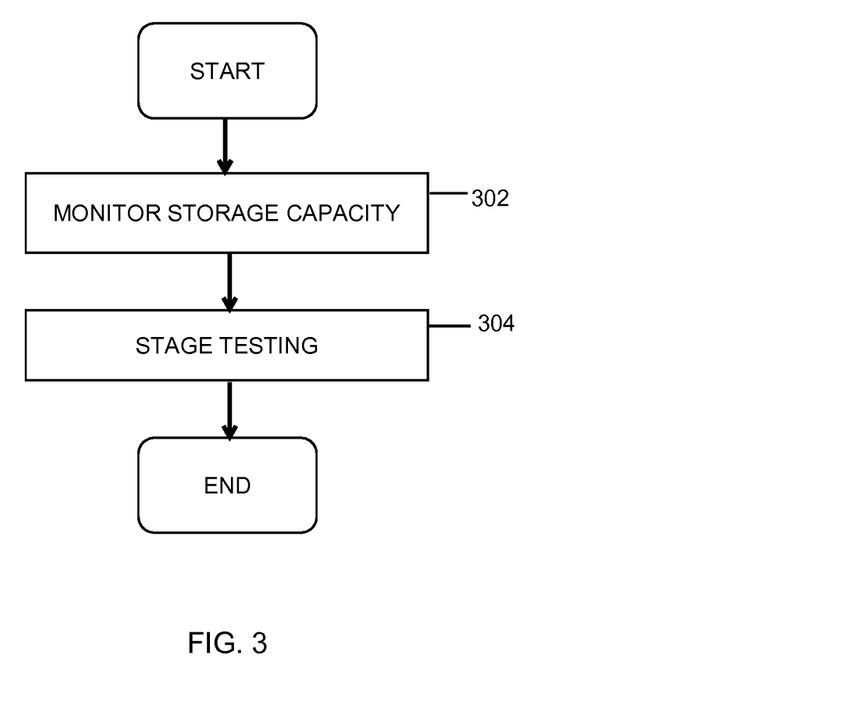
FIG. 3 depicts an example process for staged testing of transferred data, in accordance with aspects described herein.

In most onboarding scenarios, testing of the transferred application(s) and data thereof is performed. In an additional aspect described herein, staged testing of transferred data (from the target, intermediate location to the destination location) is provided, as capacity is made available at the destination site. An example process is shown in FIG. 3, which may be performed by a component such as a transition scheduler or a PC of a site, as examples. The process begins with the component monitoring storage capacity for the destination location (302). In the final production area (destination location), storage may be expensive and therefore the onboarding process might allocate storage capacity incrementally for this reason. Initially, a circular buffer may be maintained at the destination location to house data to be incrementally tested in a staged fashion. The process continues with the component performing or invokes staged testing (304). As the data is tested, it can be replaced with additional data for a next stage of testing.

Figure 4:
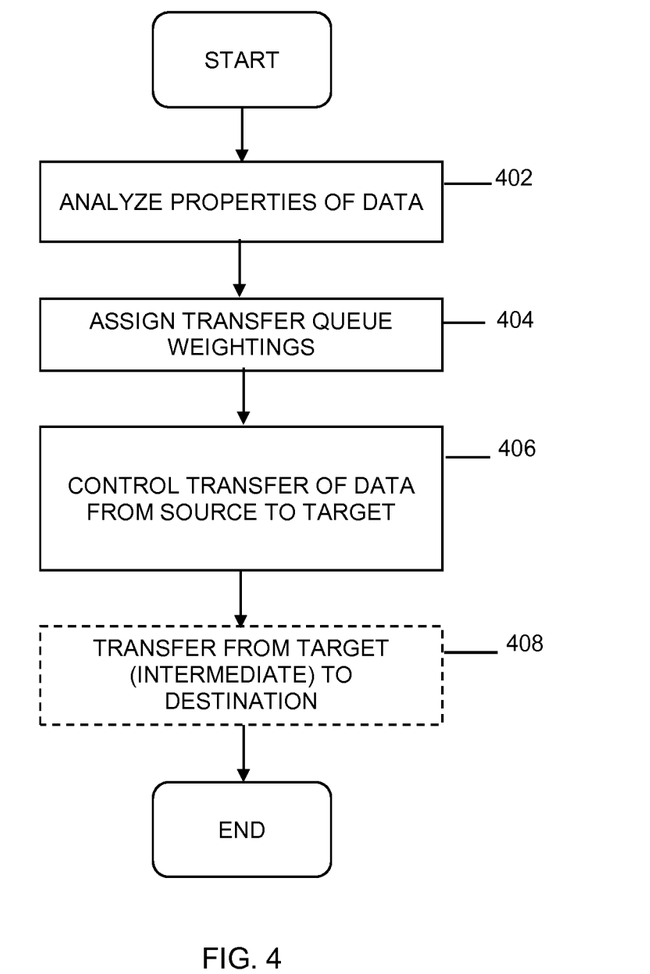
FIG. 4 depicts an example process for controlled transfer of data from a source storage location to a target storage location in accordance with aspects described herein.

FIG. 4 depicts an example process for controlled transfer of data from a source storage location to a target storage location in accordance with aspects described herein. In this example, the process is performed by a transition scheduler, though one or more aspects may be performed by one or more other components. The process begins with the transition scheduler analyzing properties of a set of data for transfer from a source storage location to a target storage location across an elastic cloud computing network as part of a staged transfer of the set of data (402). The elastic cloud computing network has controllable elastic network bandwidth for the source storage location and the target storage location. The set of data can include applications and application data, as an example.

The process continues by the transition scheduler assigning transfer queue weightings to data subsets of the set of data based on weighting parameters (404). The transfer queue weightings dictate order of transfer of the data subsets from the source storage location to the target storage location. The data subsets include an application and associated application data, as examples, and the properties analyzed can include size of the application and size of the associated application data. Example weighting parameters include one or more of: data dependencies, size, assigned priority, or rate of change. Data that is dependent on other data might be transferred after that other data, for instance. Larger sized data may be transferred before smaller sized data, and/or smaller sized data may be combined (in a subset transfer) with larger sized data to produce roughly similar sized subsets for the transfers. Data that is changing more rapidly might be given a higher weighting to complete the transfer sooner, in one example. In another example, fast-changing data may be weighted to be the last data transferred, in order to allow all other data to be setup and ready to go live so that the transition to the new site can be made very quickly after the fast changing data is finally transferred into place.

The process then continues by the transition scheduler controlling transfer of the data subsets from the source storage location to the target storage location consistent with the transfer queue weightings assigned to the data subsets (406). The controlling of this transfer includes controlling, based on costs to transfer the data subsets, bandwidth allocation of the elastic cloud computing network and a transfer schedule for the data subsets. Assigning the transfer queue weightings enables the transfer of the subsets to be controlled in this manner, where bandwidth can be scheduled and allocated to transfer the subsets according to their weighting. Transfer of data subsets with relatively low weightings might be deferred, for instance until an off-peak time when bandwidth is less expensive. Conversely, higher weighted subsets can be transferred when needed using a bandwidth allocation tailored specifically to the size and demand of that subset needing to be transferred. Advantageously, the costs to transfer the data subsets are optimized. The costs to transfer the data subsets may be dependent at least in part on bandwidth costs. The bandwidth allocation of the elastic cloud computing network and the transfer schedule may therefore be controlled based on the bandwidth costs and one or more of: time to transfer, size of the data subsets, response time requirements, latency, or protocol used to transfer. All of this may be done within the constraints of a higher-level transfer or onboarding schedule, such as one that dictates that the onboarding is to be completed within 36 hours.

In an embodiment, the target storage location includes an intermediate storage location for the staged transfer, and the staged transfer further includes a transfer from the intermediate storage location to a destination storage location. Using an intermediate storage location adds flexibility to transfer the data under parameters (timing, etc.) that optimize costs because, as one example, the data is placed into the intermedia storage in a format that need not comply with the final format needed for production. More generally, and as described herein, the transfer of the data subsets of the set of data to the target storage location may be performed as part of a cloud onboarding procedure in which the data subsets are transferred and stored to the intermediate storage location in a different structure than expected for the destination storage location. Accordingly, the process of FIG. 4 optionally includes (if the target storage is initially an intermediate storage) the transition scheduler initiating transfer of the data subsets from the intermediate storage location to the destination storage location for storage at the destination storage location in a structure for runtime usage of one or more applications (408).

Processes described herein may be performed singly or collectively by one or more computer systems, such as computer system(s) described below with reference to FIG. 5.

Figure 5:
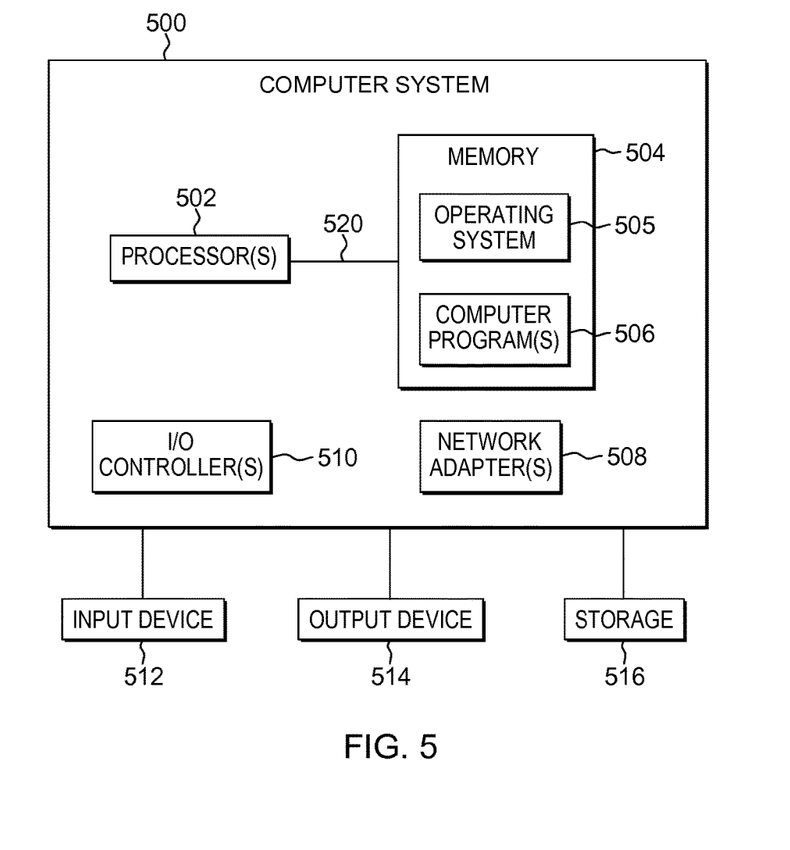
FIG. 5 depicts an example of a computer system to incorporate or use aspects described herein.

FIG. 5 depicts one example of a computer system to incorporate and use aspects described herein. A computer system may also be referred to herein as a processing device/system or computing device/system, or simply a computer. Computer system 500 may be based on one or more of various system architectures such as those offered by International Business Machines Corporation (Armonk, N.Y., USA) or Intel Corporation (Santa Clara, Calif., USA), as examples.

Computer system 500 is suitable for storing and/or executing program code and includes at least one processor 502 coupled directly or indirectly to memory 504 through, e.g., a system bus 520. In operation, processor(s) 502 obtain from memory 504 one or more instructions for execution by the processors. Memory 504 may include local memory employed during actual execution of the program code, bulk storage, and cache memories which provide temporary storage of at least some program code in order to reduce the number of times code must be retrieved from bulk storage during program code execution. A non-limiting list of examples of memory 504 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 504 includes an operating system 505 and one or more computer programs 506, for instance programs to perform aspects described herein.

Input/Output (I/O) devices 512, 514 (including but not limited to displays, microphones, speakers, accelerometers, gyroscopes, magnetometers, light sensors, proximity sensors, GPS devices, cameras, etc.) may be coupled to the system either directly or through I/O controllers 510.

Network adapters 508 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 508 used in computer system.

Computer system 500 may be coupled to storage 516 (e.g., a non-volatile storage area, such as magnetic disk drives, optical disk drives, a tape drive, etc.), having one or more databases. Storage 516 may include an internal storage device or an attached or network accessible storage. Computer programs in storage 516 may be loaded into memory 504 and executed by a processor 502 in a manner known in the art.

The computer system 500 may include fewer components than illustrated, additional components not illustrated herein, or some combination of the components illustrated and additional components. Computer system 500 may include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 6:
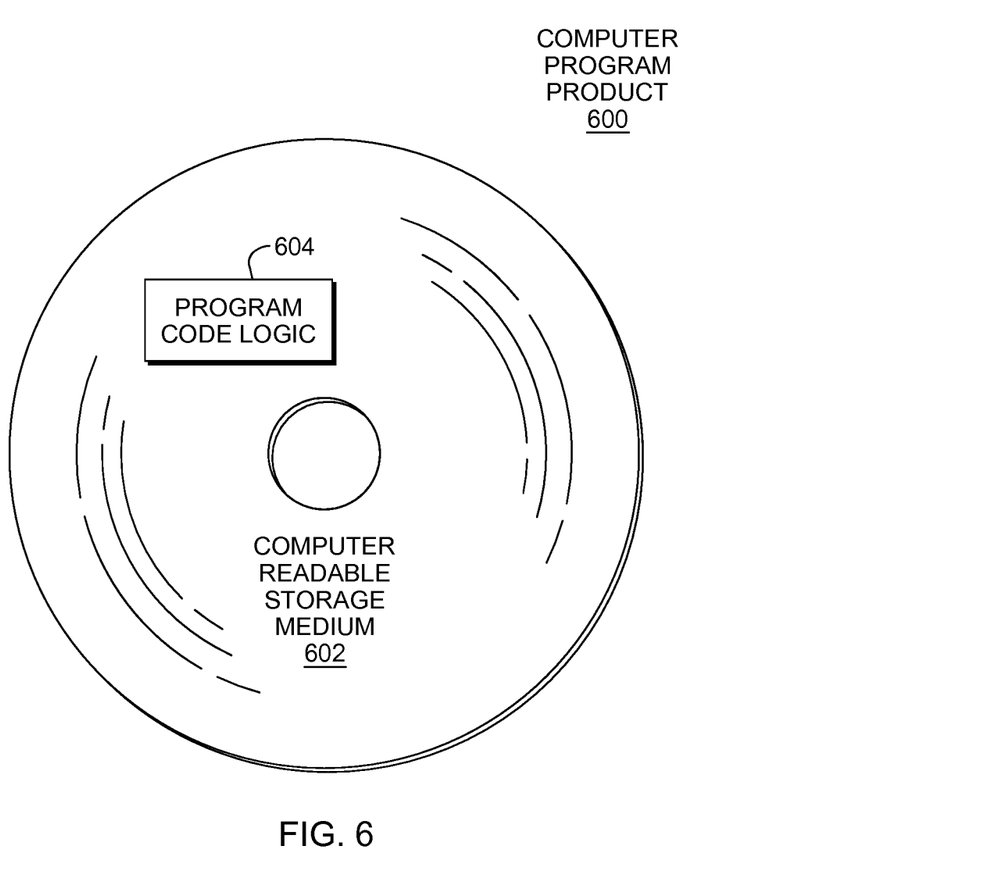
FIG. 6 depicts one embodiment of a computer program product.

Referring to FIG. 6, in one example, a computer program product 600 includes, for instance, one or more computer readable storage media 602 to store computer readable program code means, logic and/or instructions 604 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
analyzing properties of a set of data for transfer from a source storage location to a target storage location across an elastic cloud computing network as part of a staged transfer of the set of data, the elastic cloud computing network having controllable elastic network bandwidth for the source storage location and the target storage location;
assigning transfer queue weightings to data subsets of the set of data based on weighting parameters, the transfer queue weightings dictating order of transfer of the data subsets from the source storage location to the target storage location; and
controlling transfer of the data subsets from the source storage location to the target storage location consistent with the transfer queue weightings assigned to the data subsets, the controlling transfer comprising controlling provisioning of wide area network bandwidth of the elastic cloud computing network to at least the source storage location and a transfer schedule for the data subsets, wherein the provisioning of wide area network bandwidth and the transfer schedule are controlled based on costs to transfer the data subsets at different future times, and wherein the provisioning of the wide area network bandwidth is controlled by instructing a dynamic network control application programming interface (API) of a network service provider when and how much bandwidth is to be allocated.

2. The method of claim 1, wherein the data subsets comprise an application and associated application data.

3. The method of claim 2, wherein the properties of the set of data include size of the application and size of the associated application data.

4. The method of claim 1, wherein the weighting parameters comprise one or more of: data dependencies between the data subsets for transfer, size of the data subsets for transfer, or assigned priority of the data subsets for transfer.

5. The method of claim 1, wherein a weighting parameter of the weighting parameters comprises a rate of change of the set of data or a data subset thereof.

6. The method of claim 1, wherein the costs to transfer the data subsets are dependent at least in part on bandwidth costs, and wherein the provisioned wide area network bandwidth of the elastic cloud computing network and the transfer schedule are controlled based on the bandwidth costs and one or more of: time to transfer, size of the data subsets, response time requirements, latency, or protocol used to transfer.

7. The method of claim 1, wherein the target storage location comprises an intermediate storage location for the staged transfer, the staged transfer comprising a transfer from the intermediate storage location to a destination storage location.

8. The method of claim 7, wherein the transfer of the data subsets to the target storage location is performed as part of a cloud onboarding procedure, wherein the data subsets are transferred and stored to the intermediate storage location in a different structure than expected for the destination storage location.

9. The method of claim 7, further comprising initiating transfer of the data subsets from the intermediate storage location to the destination storage location for storage at the destination storage location in a structure for runtime usage of one or more applications.

10. A computer program product comprising:
a computer readable storage medium readable by a processing circuit and storing instructions for execution by the processing circuit for performing a method comprising:
analyzing properties of a set of data for transfer from a source storage location to a target storage location across an elastic cloud computing network as part of a staged transfer of the set of data, the elastic cloud computing network having controllable elastic network bandwidth for the source storage location and the target storage location;
assigning transfer queue weightings to data subsets of the set of data based on weighting parameters, the transfer queue weightings dictating order of transfer of the data subsets from the source storage location to the target storage location; and
controlling transfer of the data subsets from the source storage location to the target storage location consistent with the transfer queue weightings assigned to the data subsets, the controlling transfer comprising controlling provisioning of wide area network bandwidth of the elastic cloud computing network to at least the source storage location and a transfer schedule for the data subsets, wherein the provisioning of wide area network bandwidth and the transfer schedule are controlled based on costs to transfer the data subsets at different future times, and wherein the provisioning of the wide area network bandwidth is controlled by instructing a dynamic network control application programming interface (API) of a network service provider when and how much bandwidth is to be allocated.

11. The computer program product of claim 10, wherein the data subsets comprise an application and associated application data, and wherein the properties of the set of data include size of the application and size of the associated application data.

12. The computer program product of claim 10, wherein a weighting parameter of the weighting parameters comprises a rate of change of the set of data or a data subset thereof.

13. The computer program product of claim 10, wherein the costs to transfer the data subsets are dependent at least in part on bandwidth costs, and wherein the provisioned wide area network bandwidth of the elastic cloud computing network and the transfer schedule are controlled based on the bandwidth costs and one or more of: time to transfer, size of the data subsets, response time requirements, latency, or protocol used to transfer.

14. The computer program product of claim 10, wherein the target storage location comprises an intermediate storage location for the staged transfer, the staged transfer comprising a transfer from the intermediate storage location to a destination storage location.

15. The computer program product of claim 14, wherein the transfer of the data subsets to the target storage location is performed as part of a cloud onboarding procedure, wherein the data subsets are transferred and stored to the intermediate storage location in a different structure than expected for the destination storage location.

16. The computer program product of claim 14, wherein the method further comprises initiating transfer of the data subsets from the intermediate storage location to the destination storage location for storage at the destination storage location in a structure for runtime usage of one or more applications.

17. A computer system comprising:
a memory; and
a processor in communication with the memory, wherein the computer system is configured to perform a method, the method comprising:
analyzing properties of a set of data for transfer from a source storage location to a target storage location across an elastic cloud computing network as part of a staged transfer of the set of data, the elastic cloud computing network having controllable elastic network bandwidth for the source storage location and the target storage location;
assigning transfer queue weightings to data subsets of the set of data based on weighting parameters, the transfer queue weightings dictating order of transfer of the data subsets from the source storage location to the target storage location; and
controlling transfer of the data subsets from the source storage location to the target storage location consistent with the transfer queue weightings assigned to the data subsets, the controlling transfer comprising controlling provisioning of wide area network bandwidth of the elastic cloud computing network to at least the source storage location and a transfer schedule for the data subsets, wherein the provisioning of wide area network bandwidth and the transfer schedule are controlled based on costs to transfer the data subsets at different future times, and wherein the provisioning of the wide area network bandwidth is controlled by instructing a dynamic network control application programming interface (API) of a network service provider when and how much bandwidth is to be allocated.

18. The computer system of claim 17, wherein a weighting parameter of the weighting parameters comprises a rate of change of the set of data or a data subset thereof.

19. The computer system of claim 17, wherein the costs to transfer the data subsets are dependent at least in part on bandwidth costs, and wherein the provisioned wide area network bandwidth of the elastic cloud computing network and the transfer schedule are controlled based on the bandwidth costs and one or more of: time to transfer, size of the data subsets, response time requirements, latency, or protocol used to transfer.

20. The computer system of claim 17, wherein the target storage location comprises an intermediate storage location for the staged transfer, the staged transfer comprising a transfer from the intermediate storage location to a destination storage location, wherein the transfer of the data subsets to the target storage location is performed as part of a cloud onboarding procedure, wherein the data subsets are transferred and stored to the intermediate storage location in a different structure than expected for the destination storage location, and wherein the method further comprises initiating transfer of the data subsets from the intermediate storage location to the destination storage location for storage at the destination storage location in a structure for runtime usage of one or more applications.

* * * * *